Sept. 5, 1972   N. S. PLATAKIS ET AL   3,689,242
METHOD OF PREPARING ELECTRICALLY AND OPTICALLY ACTIVE
VITREOUS AND POLYCRYSTALLINE MATERIALS
Filed Feb. 16, 1970

INVENTORS
NICOLAOS S. PLATAKIS
HARRY C. GATOS
AUGUST F. WITT
BY Robert Shaw
ATTORNEY United States Patent Office 3,689,242
Patented Sept. 5, 1972

3,689,242
METHOD OF PREPARING ELECTRICALLY AND OPTICALLY ACTIVE VITREOUS AND POLYCRYSTALLINE MATERIALS
Nicolaos S. Platakis, Cambridge, Harry C. Gatos, Weston, and August F. Witt, Arlington, Mass., assignors to Massachusets Institute of Technology, Cambridge, Mass.
Filed Feb. 16, 1970, Ser. No. 11,682
Int. Cl. C03b 29/00, 5/16
U.S. Cl. 65—32         9 Claims

ABSTRACT OF THE DISCLOSURE

A method is disclosed for preparing an electrically and optically active material, either vitreous or polycrystalline, that provides a material that is non-porous, contains no inclusions, is chemically homogeneous, and one that can be cut or otherwise formed to some desired uniform geometrical shape. The process disclosed includes subjecting the components of the material held within a sealed ampoule or other closed container to an elevated temperature in an inert atmosphere or vacuum for a time period long enough for the components to become molten and to react chemically with one another. Heat is then withdrawn from the molten material to lower the temperature to a value at which a thin layer of molten materials adheres to the inner surface of the container. Relative movement is effected between the bulk of the molten material and the thin layer of melt that adheres to the inner surface, the thin layer being moved away from the bulk of the melt to allow solidification thereby to form a solidified layer. The solidified layer is alternately brought into contact with the bulk of the molten material to pick up a thin layer of melt and removed from such contact to allow the thin layer to solidify, there being a continued withdrawal of heat from the region occupied by the ampoule in order that the solid layer will increase in thickness layer upon layer as additional molten material solidifies.

---

Figure 1:
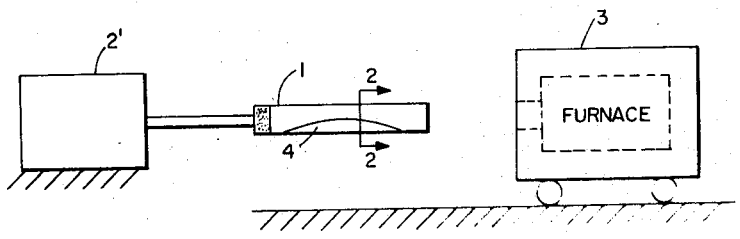

The invention described herein was made in the performance of work under a National Aeronautics and Space Administration contract and is subject to the provisions of Section 305 of the National Aeronautics and Space Act of 1958, Public Law 58–568 (72. Stat. 435, 42 U.S.C. 2457).

The present invention relates to a method of preparing vitreous and polycrystalline materials particularly useful as electrically and optically active substances.

The discussion to follow is primarily directed to the processing of vitreous materials, but it is useful, as well, for preparing polycrystalline materials, as previously mentioned. Chalcogenide glasses have found widespread and increasing usage in electronic and optical devices. Some of the major problems encountered in the use of such materials include chemical non-homogeneity, porosity (or inclusions) and lack of well-defined geometrical shapes, the latter occurring because brittleness, for example, of the material heretofore available prevented preparation of samples having ascertainable dimensions. Thus, in semiconducting or other devices, one serious difficulty encountered is the inability to obtain a device having a determinable dimension (as a cube, for example) to make possible the determination of such things as electrical characteristics. In work done in connection with the glasses herein described for illustrative purposes, the system $xAs_2Se_3 \cdot ySb_2Se_3$ was used, and in such glass the problem of chemical homogeneity is quite acute; furthermore, due to their very pronounced brittleness the mechanical preparation of samples with well-defined geometrical shapes is tedious at best and often practically impossible, as mentioned.

An object of the present invention, accordingly, is to provide a method of preparing electrically and optically active vitreous and polycrystalline materials, which avoids chemical nonhomogeneity, porosity and inclusions in the materials and provides materials susceptible of being formed into well-defined geometrical shapes.

An other object is to provide a method of preparing the system $xAs_2Se_3 \cdot ySb_2Se_3$ with a higher concentration of $Sb_2Se_3$ than has heretofore been possible in forms geometrically suitable for measurements.

Other objects are discussed in the following description and are particularly pointed out in the appended claims.

By way of summary, the objects of the invention are attained by a method of preparing electrically and optically active material, either vitreous or polycrystalline, that avoids chemical non-homogeneity, porosity, inclusions and non-determinable geometrical shapes in the finished product, that includes, subjecting the components of the material to an elevated temperature for a long enough time for the components to change to a molten state and to react chemically. Thereafter heat is withdrawn from the molten material to reduce the temperature to a value at which a thin liquid layer adheres to the inner surface of the ampoule or other container within which the components are held. Relative movement is effected between the thin layer of melt that adheres to said inner surface and the bulk of the molten material to allow the thin layer to solidify. The solidified portion is thereafter alternately moved into contact with the bulk of the molten material and removed from such contact to allow solidification, thereby to build up the solidified portion as additional molten material solidifies layer upon layer.

Figure 2A:
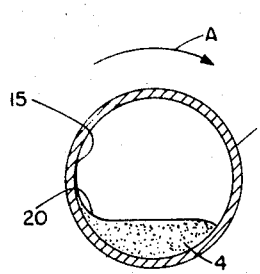
Figure 2B:
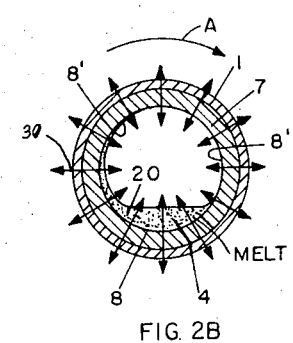
Figure 2C:
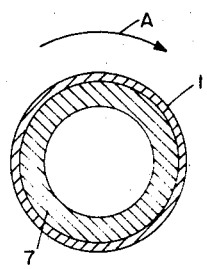
Figure 3A:
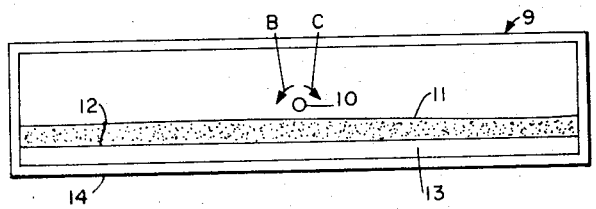
Figure 3B:
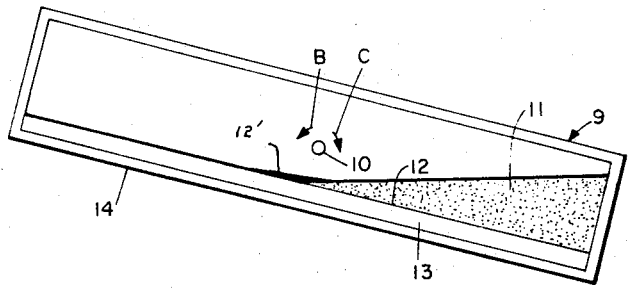

The invention will now be explained in connection with the accompanying drawings in which:

FIG. 1 shows schematically apparatus adapted to practice the method herein disclosed, relative movement between the bulk of the molten material herein discussed and the solidified layer or portion being provided by rotating the ampoule containing the molten material;

FIGS. 2A, 2B and 2C are views, on an enlarged scale, taken upon the line 2—2 in FIG. 1 to show respectively conditions in which the material within the ampoule is completely molten, partially molten and partially solidified, and completely solidified; and FIG. 3A is a side view of a hollow rectangular-shaped quartz container horizontally oriented and adapted to pivot about a central axis thereby to provide relative movement between the bulk of a molten material and a solidified layer within the container; and FIG. 3B shows the container of FIG. 3A rotated or pivoted about 30° in the clockwise direction from the position shown in FIG. 3A, it being understood that the container is also pivotable in a counterclockwise direction from the position shown in FIG. 3A.

By way of preliminary explanation, the method herein disclosed contemplates preparation of either a vitreous material or a polycrystalline material having superior structural characteristics by eliminating in the finished product the deficiencies discussed. The process disclosed includes subjecting the components of the material held within a sealed container to an elevated temperature in an inert atmosphere (as argon) or a vacuum for a time period long enough for the components to become molten and to react chemically with one another. Heat is then withdrawn from the molten material to lower the temperature to a temperature at which a thin liquid layer will adhere to the inner surface of the container. Relative movement is effected between the bulk of the molten material and the thin layer of melt that adheres to the inner surface, the thin layer being moved away from the bulk of the melt to allow solidification thereby to form a solidified layer. The solid layer thereby formed is alternately brought into contact with the bulk of the melt to pick up further thin layers of melt and removed from such contact to allow solidification. In the two illustrative embodiments the container is a cylindrical quartz ampoule and a rectangular-shaped quartz container, respectively, and movement is introduced between the container and the bulk of the melt. In the embodiment of FIGS. 1, 2A, 2B and 2C, as latter discussed, the container is moved by rotation, the bulk melt being stationary; and, in the embodiment at FIGS. 3A and 3B, the bulk melt is moved. In either event, however, in the course of such movement a relatively cooler surface makes contact with the melt and picks up a thin layer of the melt; the layer thereafter cools and solidifies as the surface separates from the bulk of the melt. Some short time later the solidified portion is moved into contact with the bulk melt and a further thin layer of the melt is picked up and moved away from the bulk melt to add a thin layer of solid material to the previously solidified portion or layer. In this fashion a solid material of any required thickness is built up layer upon layer, and it is the relative motion between the solid material, thus formed, and the bulk of the molten material at the interface therebetween during the build-up that is vital to the present concept.

The method herein described in concerned with the preparation of materials that are electrically active (for use as semiconductor devices and the like) and/or optically active (for use as laser devices and the like). The method overcomes some of the main problems associated with the characterization, study and use of such materials. These problems, as discussed in the literature and as discussed previously herein, are lack of chemical homogeneity, porosity (or inclusions) and lack of well-defined geometrical shapes. To prepare the material, the components of the particular material being prepared, in one aspect of the invention, are placed in a non-reactive environment which can be obtained by placing the compounds in the quartz ampoule labeled 1 in FIG. 1 and flashing, evacuating and sealing the ampoule. The ampoule is secured to the shaft of an electric motor 2' and is inserted into the heat chamber of an electric furnace 3 the latter of which is movable translationally to the left or right in the figure. The ampoule 1, as shown, is maintained in horizontal orientation and rotated slowly, in the direction of the arrow designated A in FIGS. 2A, 2B and 2C, while the temperature is raised to a sufficiently high value to change the components to a molten state, as shown at 4 in FIG. 2A, for a long enough time for the components to become molten, which is the condition represented in FIG. 2A, and to react chemically with each other. The furnace is then rolled to the right thereby removing the ampoule from the heat region and quenching is performed in air at room temperature or in other quenching media, rotation being continued throughout the quenching period. Heat is thereby withdrawn from the entire surface region of the ampoule to reduce the temperature of the bulk material 4 while maintaining the ampoule rotation. A laminar structure is formed as the region from which the heat is withdrawn reduces to a temperature at which the formation of a liquid layer covering the inner surface (designated 15) of the ampoule occurs and a solidified portion 7 is formed in the manner herein discussed; the solid portion gradually increases in thickness, as shown in FIGS. 2B and 2C, as additional molten material is picked up at the interface, designated 8, between the bulk of the molten material 4 and the solidified material of the layer 7 and thereafter solidifies. The bulk material 4, as shown, occupies less than the whole of the inner volume of the ampoule 1 so that, upon rotation, the solidified portion passes through the molten material (which remains at the lower part of the ampoule) and out to allow the thin layer of the molten material shown commencing at 20 that adheres to the layer 7 at the interface 8 to solidify at the exposed part 8' and thereby build the thickness of the solidified portion 7 layer upon layer, as illustrated by the progressive build-up shown in FIGS. 2A to 2B to 2C.

The apparatus shown schematically in FIG. 1 has been used to prepare vitreous and polycrystalline $$As_2Se_3-Sb_2Se_3$$

The components or compounds $As_2Se_3$ and $Sb_2Se_3$ were prepared individually from their elements which were semiconductor grade 99.999+% pure. In preparation, nominally stoichiometric amounts of each compound were placed in a quartz ampoule which was repeatedly evacuated, flashed with argon and finally evacuated to $10^{-6}$ mm. Hg before being sealed. In early work each ampoule was heated from about five hours at 350° C. and thereafter the temperature was raised to 750° C. and maintained for another five hours, but later work showed the desired results can be accomplished using one-hour heat periods. The resulting compounds $As_2Se_3$ and $Sb_2Se_3$ were placed in the desired proportions in a quartz ampoule which, in turn, was flashed, evacuated and sealed, as before, to provide a non-reactive environment. (Of course, the elements As, Sb, Se could be used directly as the starting materials for the preparation of the alloys.) The ampoule was fitted on the motor shaft and rotated at about one hundred and twenty-five r.p.m., the ampoule being inserted into the furnace 3 where a temperature of 750° C. was maintained for a one hour period during which rotation was maintained. It was then withdrawn from the furnace and quenched in air at room temperature while still under rotation. The technique resulted in hollow cylinders of vitreous material of uniform wall thickness and chemical composition. The samples showed no porosity or other macroscopic defects. It should be pointed out that the ampoule 1 must be substantially horizontal to provide uniform wall thickness throughout the length of the cylinder.

The molten material 4 stays at the bottom of the ampoule 1, as shown, since its temperature is high and hence its viscosity is low, even though the ampoule is rotating. For the above situation to exist, the rotation speed must not exceed a certain limit. If the speed of rotation exceeds this limit, centrifugal force becomes dominant and the molten material is dispersed over the inner surface of the ampoule. Thus the molten material, which is globular-shaped as shown in FIG. 1, will, if the speed of rotation is increased beyond a certain magnitude, spread toward the ends of the ampoule and, also, will spread uniformly over the inner periphery of the ampoule. The distribution of the melt will depend on the attitude of the ampoule. For a perfectly horizontal position, the distribution will be uniform over the entire inner surface of the ampoule, but any inclination from a perfectly horizontal position will result in migration toward an end thereof.

From the moment the ampoule material system is removed from the furnace for quenching, as before mentioned, heat flows out of the system through the ampoule walls to all directions as represented by the arrows 30 in FIG. 2B. The temperature of the molten material decreases progressively and so does its viscosity. Finally a temperature is reached at which the molten material starts to form a thin liquid layer which covers the inner surface area of the ampoule. The formation of the thin liquid layer happens at a certain temperature at which the surface tension and viscosity values favor it. The thin layer solidifies progressively from the outer region, where the temperature is lower, inwardly and new liquid is added continuously to the solidified layer as it passes through the bulk molten material 4 during rotation thereby forming a cylindrical-shaped solid as shown at 7, in a layer-type fashion from the outer to the inner part of the cylinder 7. Shortly after solidification is completed a sharp noise is heard and the cylindrical-shaped solid 7 acquires a shiny appearance; this happens at a temperature at which the outer diameter of the solidified hollow cylinder 7 becomes smaller than the inner diameter of the quartz ampoule and the solidified cylinder 7 separates from the quartz ampoule (the solid cylinder 7 contracts more than the quartz because of its higher thermal expansion coefficient). The whole process for complete solidification takes five to ten minutes for an amount of fifteen grams of solidifying material contained in a quartz ampoule having a one centimeter inner diameter, a ten centimeter length, and one to one and one-half millimeter wall thickness. The time from the moment the shaft-ampoule arrangement is removed from the furnace in air at room temperature until the first thin liquid layer is formed, is one to two minutes. It has been found, as mentioned, that the length of the liquid along the ampoule axis, and hence the length of the solidified cylinder-material depends upon the rotation speed. The higher the rotation speed the more the molten material will be spread along the ampoule axis and hence the thinner the solidified hollow cylinder will be, but, as mentioned previously, the speed must be kept below a value at which centrifugal force becomes dominant.

The above restrictions on the rotational speed are imposed only after the ampoule is taken from the furnace. Before the ampoule is removed from the furnace, the highest rotational speed possible is used in order to assure good mixing, and hence, faster-reaction and homogeneity.

The resultant product from the previously described method is, as mentioned, vitreous. A polycrystalline material can be produced by following the same procedure except that cooling of the ampoule, once the components have melted and reacted, is performed by merely turning off or lowering slowly power to the furnace 3 and allowing the ampoule to cool slowly within the furnace chamber.

The cylindrical ampoule 1 is replaced in the embodiment of FIGS. 3A and 3B by a hollow, rectangular-shaped, quartz container 9 adapted to pivot in the direction of the arrows labeled B and C about a central axis 10 to provide relative motion between the bulk of the moten material numbered 11 and the solidified layer or portion labeled 13. As the container 9 is oscillated, the bulk of the molten material moves from the uniform thickness condition in FIG. 3A to the condition shown in FIG. 3B and back to a condition in which the bulk material is at the left end of the container. As the molten material moves from left to right it leaves behind a thin layer of melt as shown at 12' in FIG. 3B. In this fashion the solidified layer 13 is alternately brought into contact with the bulk of the molten material 11 to pick up a thin layer of the melt at the interface 12 therebetween and removed from such contact to allow the thin layer to solidify. In FIG. 3B the left part of the solid 13 is brought into contact with the melt 11 when the container 9 is oscillated in the direction of the arrow B to cause the melt to move from the right side to the left side of the container. The rate of such oscillation must be slow to allow the melt 11 to move from the one side of the container to the other side to allow freezing of the melt at the exposed interface, but it must be fast enough to ensure uniformity. The rate of oscillation will, therefore, depend, among other things, on the heat flow through the base 14 of the container 9 and the quantity of melt remaining in the container. Again, quenching can be performed in air at room temperature or in other quenching media to provide vitreous materials, or cooling can be effected within the furnace chamber, as before, to provide polycrystalline materials. More sophisticated apparatus than that shown in FIG. 3 would embody heat sink apparatus secured to the base 14 with controlled cooling to control with greater precision the withdrawal of heat from the interface region 12 and thereby control the rate of growth and character of the layer 13. The ampoule 1 and the container 9 can be made of any kind of material which does not react with the melt and has a lower thermal expansion coefficient than that of the material of the solidified layer. Modifications of the invention will occur to persons skilled in the art.

What is claimed is:

1. A method of preparing an electrically and optically active material, that comprises, the sequential steps of placing the components of the material in a sealed quartz ampoule in a non-reactive environment, raising the temperature in the space occupied by the ampoule to a temperature sufficiently high to change said components to a molten state for a long enough time for the components to become molten, rotating the ampoule in a horizontal position, thereafter lowering the temperature in the space occupied by the ampoule to a temperature at which the melt will adhere to the inner surface of the ampoule to provide a layer of melt on said surface in the course of rotation, and maintaining the ampoule rotation thereby to form a laminar structure as heat is withdrawn from said layer of melt to reduce the temperature thereof below its melting point and form on the inner surface of the rotating ampoule a solidified layer which gradually increases in thickness as additional molten material is picked up by the solidified layer at the interface between the bulk of the molten material and the solidified layer in the course of such rotation.

2. A method as claimed in claim 1 in which the non-reactive atmosphere is created by flashing, evacuating and sealing the ampoule and in which the molten material occupies less than the whole of the inner volume of the ampoule.

3. A method as claimed in claim 1 in which the ampoule is cylindrical and the speed of rotation of the ampoule is high enough to ensure uniformity of the solidified portion and is below a value at which centrifugal force becomes dominant.

4. A method of preparing an electrically and optically active material that avoids chemical non-homogeneity, porosity, and inclusions and that provides a material which can be cut or otherwise formed to predetermined geometrical shapes, that comprises, placing the components of the particular material being prepared in a non-reactive environment, subjecting the components to a temperature sufficiently high to change them to a molten state for a long enough time for the components to become molten bulk material and to react chemically with each other, withdrawing heat from the molten material to reduce the temperature thereof to a temperature at which the melt will adhere to a surface brought into contact therewith to form a thin layer of melt upon the surface, effecting relative movement between the thin layer of melt and the bulk of the molten material thereby to form a solidified layer when the thin layer of melt is removed from contact with the bulk of the molten material and the temperature thereof drops below its melting point, thereafter bringing the solidified layer thus formed into contact with the bulk of the molten material to pick up a further thin layer of melt and removing the further thin layer of melt to allow solidification thereof, the solidified layer being alternately brought into contact with the bulk of the molten material and removed from such contact to allow solidification while continuing to withdraw heat from the region occupied by the molten material thereby to produce a gradual increase in the thickness of the solidified layer as additional molten material is picked up and solidifies, and controlling the rate at which heat is withdrawn to provide either vitreous or polycrystalline material depending upon the rate of cooling.

5. A method as claimed in claim 4 in which quenching is performed at room temperature.

6. A method as claimed in claim 4 in which the solidified layer is subjected to rotational motion of appropriate magnitude to effect relative movement between the bulk of the molten material and the solidified layer at the interface therebetween to allow the thin layer of melt that adheres to the solidified layer at the interface to be removed from contact with the bulk of the molten material to allow solidification thereof and thereby to build in thickness layer upon layer.

7. A method as claimed in claim 6 in which the rotational angular velocity is below a value which would introduce substantial centrifugal force upon the molten material and high enough to ensure uniformity of the solidified portion.

8. A method as claimed in claim 4 in which the material is subjected to oscillatory motion to effect relative movement between the bulk of the molten material and the solidified layer, the magnitude of said relative movement being sufficiently great to move the bulk of the molten material away from a part of the interface between the molten material and the solidified layer to allow the thin layer of melt that adheres to the surface of the solidified layer at said part to solidify and thereby build the thickness of the solidified portion layer upon layer.

9. A method of preparing electrically and optically active vitreous and polycrystalline materials, that comprises, placing the components of the particular material being prepared in a non-reactive environment, sequentially subjecting the components of the particular material being prepared to a temperature sufficiently high to change said components to a molten state for a long enough time for the components to become molten and to react chemically with each other, withdrawing heat from one region of the molten bulk material thereby formed to reduce the temperature at said one region below the melting point thereof thereby to form a solidified layer, and effecting relative movement between the solidified layer and the molten material while continuing to withdraw heat from said one region, the solidified layer being alternately brought into contact with the bulk of the molten material to pick up a thin layer of the melt and removed from such contact to allow the thin layer of the melt to solidify thereby to produce a gradual increase in the thickness of the solidified layer as additional molten material solidifies.

References Cited

UNITED STATES PATENTS

| | | | |
|---|---|---|---|
| 2,007,755 | 7/1935 | Ferguson | 65—134 |
| 2,930,098 | 3/1960 | Emeis | 65—El. Heat Dig |
| 2,967,115 | 11/1961 | Herrick | 65—Quartz Dig |
| 3,088,853 | 5/1963 | Harper | 65—32 X |
| 3,238,288 | 3/1966 | McGuire et al. | 65—El Heat Dig |
| 3,451,794 | 6/1969 | Patterson | 65—32 X |
| 3,486,870 | 12/1969 | Vervaart et al. | 65—32 X |
| 3,489,841 | 1/1970 | Cheng | 65—El Heat Dig |

OTHER REFERENCES

Scientific American, December 1967, Zone Refining, pp. 63 to 70 and 72.

FRANK W. MIGA, Primary Examiner

U.S. Cl. X.R.

65—33, 134, 337